Inventor
Henry Svihla
by Frank J Schraeder Jr
Attorney

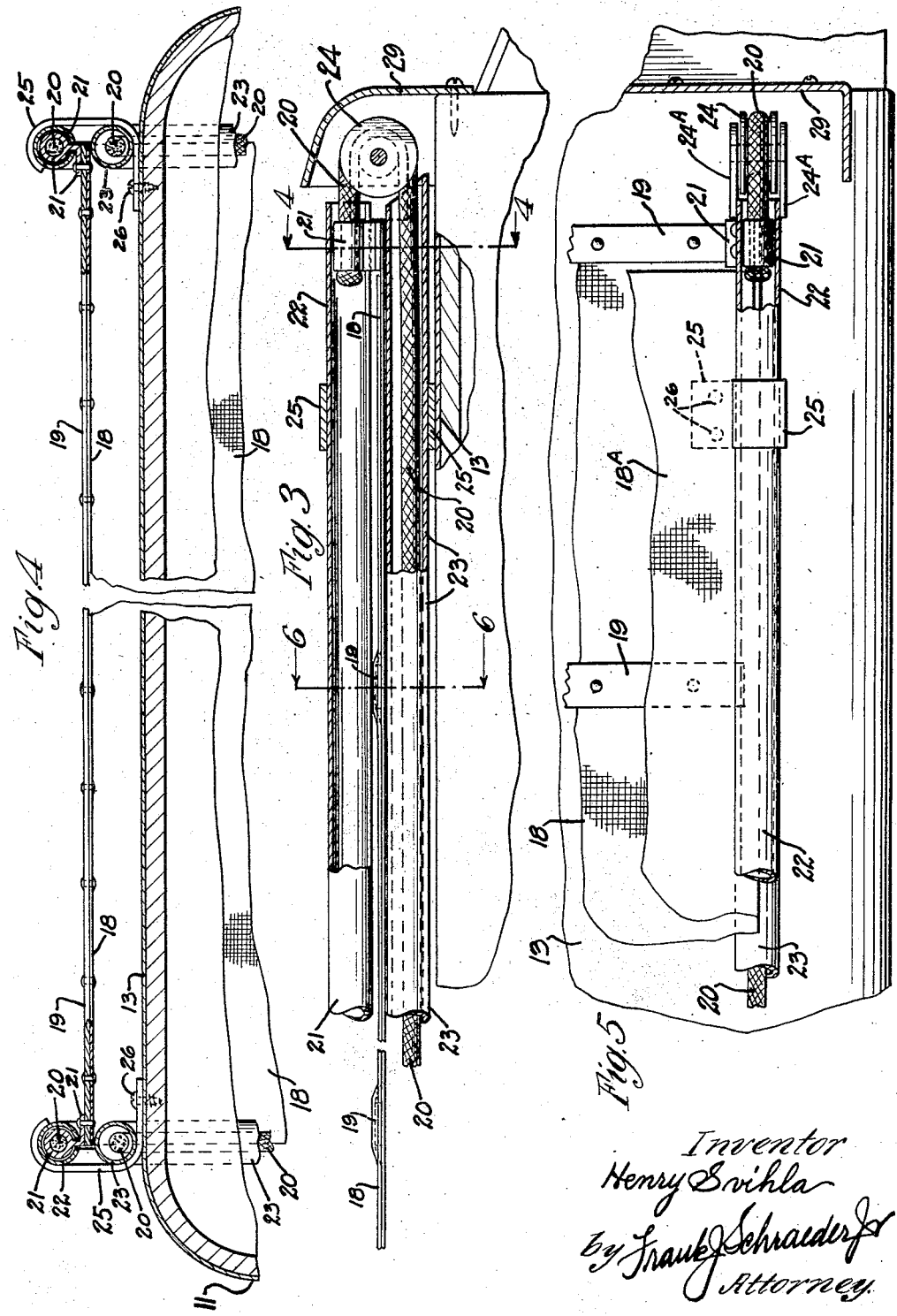

May 5, 1931. H. SVIHLA 1,804,131
AUTOMOBILE COVER
Filed Sept. 21, 1929 3 Sheets-Sheet 3
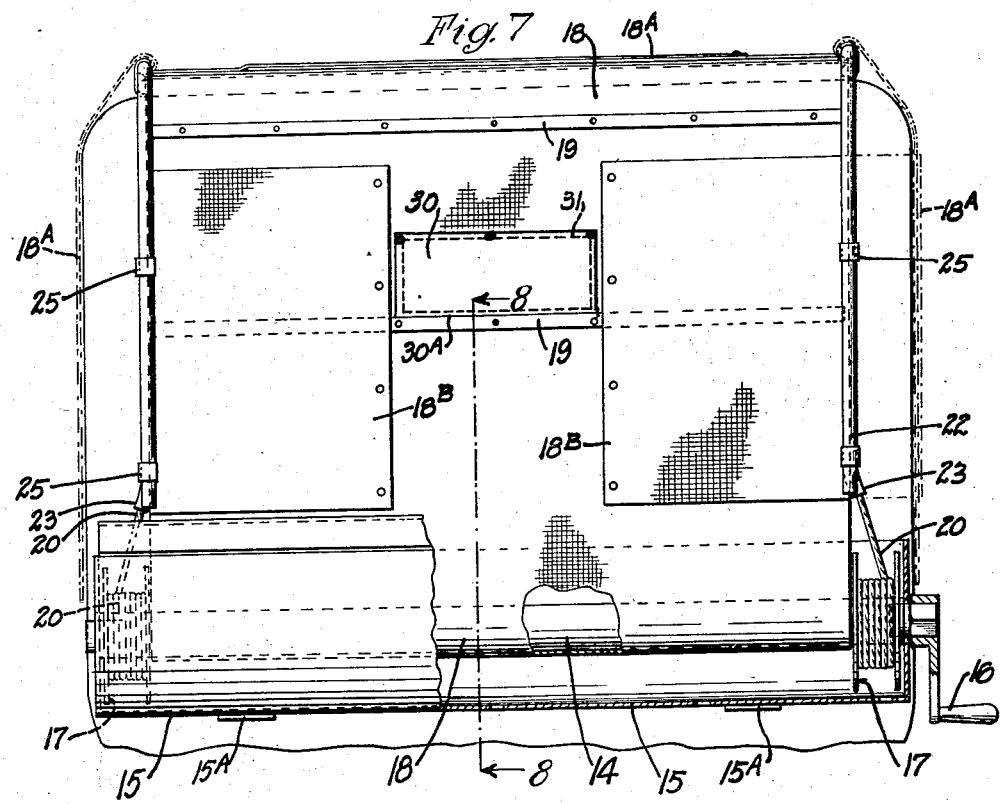
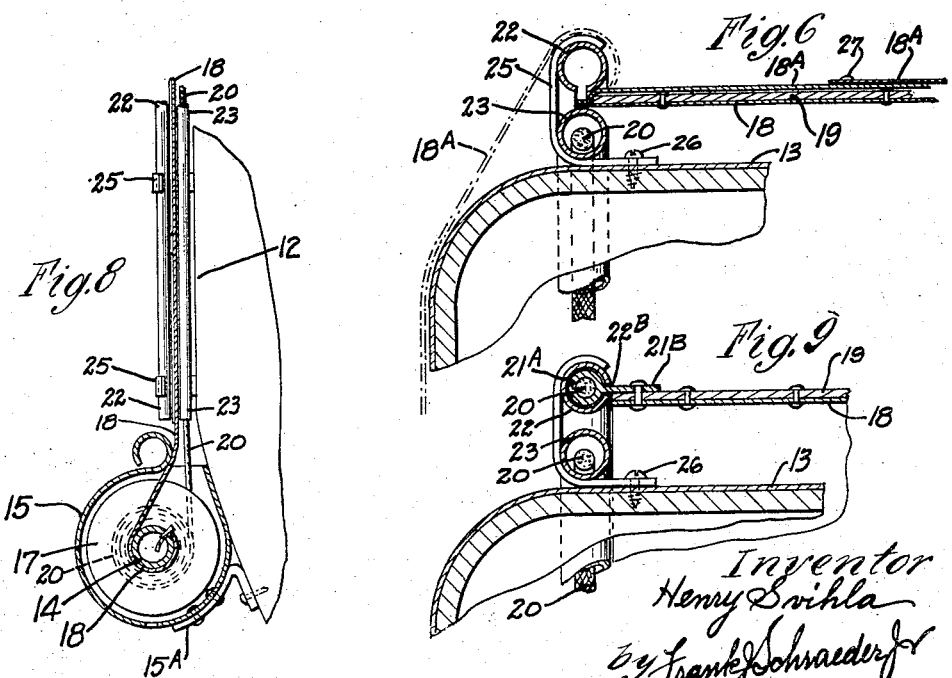

Patented May 5, 1931

1,804,131

UNITED STATES PATENT OFFICE

HENRY SVIHLA, OF CHICAGO, ILLINOIS

AUTOMOBILE COVER

Application filed September 21, 1929. Serial No. 394,358.

This invention relates to automobile covers and has among its objects to provide a cover installed upon the automobile and adapted to be moved into position to protect the greater portion of the body thereof from dust, rain and sun during its storage in the open.

Another object of the invention is to provide a cover for the automobile body which is mounted or wound on a roller and which roller can readily be manually operated to move the cover in suitable guides from the roller over the back and top of the body into position to permit the folded sides thereof to be unfastened and positioned to cover the sides of the body.

A further object of my invention resides in the provision of flexible means operatively connected with the roller for drawing the cover up over the top thereof.

A still further object of my invention is found in the details of construction tending to enhance the simplicity of construction and ease of operation.

With the above and other objects in view which will become readily apparent from the following description and preferred embodiment shown in the attached drawings, my invention consists in the novel combination, construction and arrangement of the parts and members shown in the attached drawings, described in the following specifications and particularly pointed out in the appended claim.

Referring to the drawings:—

Fig. 3, is an enlarged longitudinal section showing the forward end of the cover guiding tubes and the flexible cable for drawing the cover from its roller.

Fig. 4, is a cross-section taken on line 4—4 of Fig. 3.

Fig. 5, is a side portion of a plan view of the cover, guides, and drawing cable and end sheave.

Fig. 6, is a cross-section of one of the side guides and cover taken on line 6—6 of Fig. 3.

Fig. 7, is a rear view of the cover, with parts broken to show details, and showing the cover drawn over the top of the automobile body with parts of the cover unfolded.

Fig. 8, is a vertical section taken on line 8—8 of Fig. 7, showing the roller for the cover and housing therefor.

Fig. 9, is a cross-section of one of the side guides in modified form.

Figure 1:
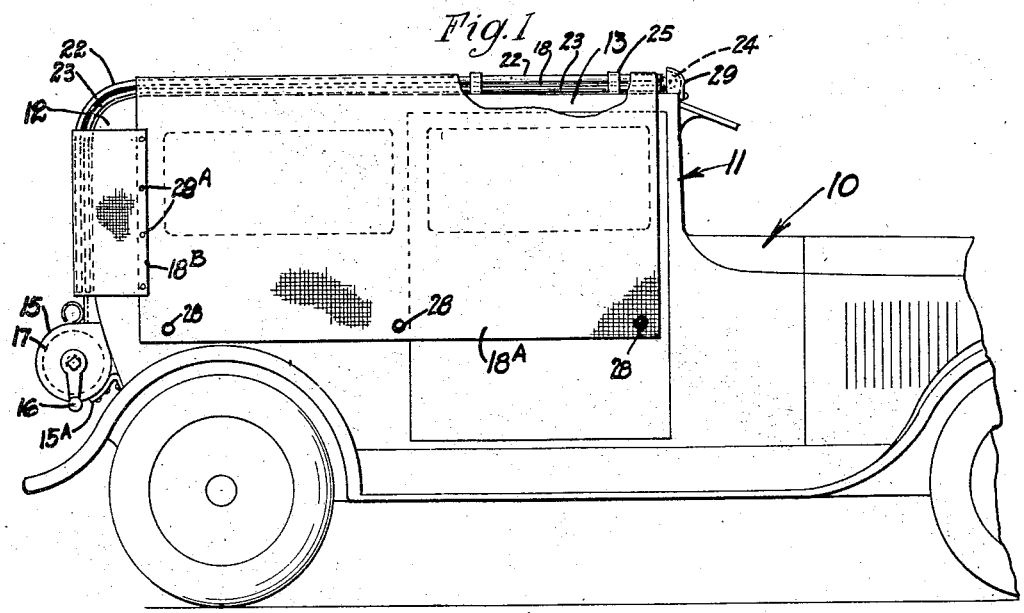
Fig. 1, is a side elevation of a portion of an automobile provided with my improved cover and showing the cover in use.

In the illustrations, 10 indicates an automobile having a body 11, the rear end thereof being indicated by 12, and the top thereof by 13.

A roller 14, rotatably positioned in a housing 15, is adapted for rotation by a suitable hand-crank 16. The roller 14 is provided with a pair of end sheaves 17, formed integrally therewith, and the roller portion between the sheaves 17 is adapted to receive the cover 18 which is wound thereon when not in use.

The cover 18 may be made of any suitable material such as a light-weight canvas and the central portion thereof is preferably reinforced with spaced stiffening bars 19; the bar on the front end of the cover being securely fastened at its ends to the flexible cables 20 by means of clips 21. The upper portion of the clips 21 are mounted to travel or slide within the upper guide tubes 22 which are slotted on their lower sides to permit the projection of the lower end of the clips 21 there-through as shown in Figs. 3, 4, 5, and 6.

A sheave 24 is provided at the forward end of the two guide tubes 22 to permit the return of the cables 20 through the lower guide tubes 23.

The sheaves 24 are rotatably supported in suitable housings 24ᴬ which are welded to the ends of the tubes 22 and 23.

The guide tubes 22 and 23 extend upwardly from above the housing 15 along the back 12 and over the body top 13 to its forward end, as shown in Fig. 1. These upper and lower tubes are welded to the supporting clips 25 which retain the tubes 22 and 23 in spaced relative position to form a guide channel therebetween for the sides of the cover 18, and the clips 25 are suitably spaced and secured to the back 12 and top 13 with suitable screws 26.

When the cover 18 is unwound from its roller 14, in the housing 15, the cables 20 will exert a pull upon the end bar 19 of the cover 18 and will be moved through the upper guide tubes 22 over the sheaves 24 into the lower guide tubes 23 and through their slightly deflected ends onto the sheaves 17.

The cover 18 is provided with integral sides 18^A which are normally folded over each other over the bars 19 and fastened together by suitable snap buttons 27. After the cover 18 has been drawn to its position over the top 13 the buttons 27 may be unsnapped and the sides 18^A dropped into place over the sides of the body 11. The lower edges of the sides 18^A are also provided with suitable buttons 28 for securance to the sides of the automobile body.

The rear end of the cover 18 is also provided with integral side extensions 18^B which may be brought around the rear corners of the automobile body and fastened with snap buttons 28^A to the sides 18^A, as shown in Fig. 1.

The housing 15 may be mounted on the automobile body with any suitable brackets such as bent bars 15^A.

Figure 2:
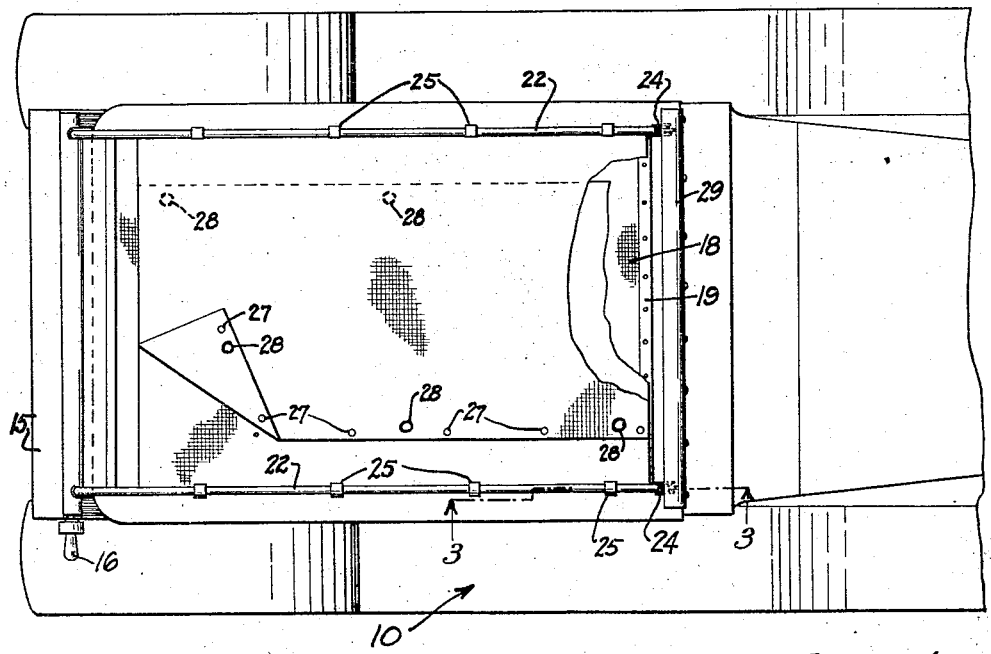
Fig. 2, is a plan view of a portion of the automobile showing portion of the cover folded and portions broken away to indicate the cover in position before the sides thereof are moved to cover the sides of the automobile.

In hot weather, the cover 18 may be used also during the driving of the automobile in which case the cover 18 is drawn up to cover only the back and top of the body with the extensions 18^A and 18^B in folded positions as shown in Figs. 2 and 7. In such use the cover 18 tends to keep the interior of the body cooler which adds to the comfort of the user of the automobile.

A hinged flap 30 may be provided in the center of the cover 18 which may readily be unbuttoned and dropped to hang below the hinge 30^A to uncover the rear window 31 of the automobile to afford the use of a rear vision mirror at the driver's seat where the cover 18 is thus used during driving.

To prevent the passage of air currents under the cover 18 during its use in riding, as above explained, I provide a shield or deflector 29 at the front end as shown in Figs. 3 and 5.

I claim:—

The combination with an automobile of a housing mounted on said automobile, a roller rotatably mounted in said housing, said roller having a sheave fixed thereto at each end thereof, a crank for rotating said roller and sheaves, a pair of guides extending upwardly from said housing and over the top of said automobile, each pair of said guides comprising a pair of spaced tubular members, a flexible cover normally wound on said roller between said sheaves, said cover having a plurality of spaced stiffening crossbars, one end of said cover being attached to said roller, a pair of flexible cables attached at one end respectively to said sheaves and being adapted to be wound on said sheaves as the cover is unwound from said roller upon the rotation of said crank, the ends of said stiffening cross-bars being disposed between said spaced tubular members, one of each of said pairs of spaced tubular members being slotted longitudinally thereof, and a clip slidably mounted in each of said slotted tubular members, both of said clips being rigidly connected to the cross-bar at the free end of said cover and one end of each cable being fixed to one of said clips, said flexible cables being movable within said tubular guide members.

In witness whereof I affix my signature.

HENRY SVIHLA.